(12) United States Patent
Ollis et al.

(10) Patent No.: US 7,221,672 B2
(45) Date of Patent: May 22, 2007

(54) ARCHITECTURE FOR LINKING MULTIPLE INTERNET PROTOCOL TELEPHONY DEVICES HAVING A COMMON TELEPHONE NUMBER

(75) Inventors: Jeffrey D. Ollis, Harleysville, PA (US); David Horoschak, Furlong, PA (US)

(73) Assignee: General Instrument Corporation, Horsham, PA (US)

( * ) Notice: Subject to any disclaimer, the term of this patent is extended or adjusted under 35 U.S.C. 154(b) by 902 days.

(21) Appl. No.: 09/938,366

(22) Filed: Aug. 24, 2001

(65) Prior Publication Data

US 2003/0039238 A1 Feb. 27, 2003

(51) Int. Cl.
H04L 12/66 (2006.01)

(52) U.S. Cl. ............. 370/352; 370/356; 370/401

(58) Field of Classification Search .......... 370/352, 370/353, 354, 355, 356, 400, 401; 379/88.17, 379/93.01

See application file for complete search history.

(56) References Cited

U.S. PATENT DOCUMENTS

| 5,563,937 | A | 10/1996 | Bruno et al. | |
|---|---|---|---|---|
| 6,035,026 | A | 3/2000 | Kim | |
| 6,188,760 | B1* | 2/2001 | Oran et al. | 379/230 |
| 6,411,705 | B2* | 6/2002 | Oran et al. | 379/230 |
| 6,904,038 | B1* | 6/2005 | Moon et al. | 370/353 |
| 6,958,992 | B2* | 10/2005 | Lee et al. | 370/352 |
| 2001/0004361 | A1* | 6/2001 | Kobayashi | 370/401 |
| 2001/0055382 | A1* | 12/2001 | Oran et al. | 379/229 |
| 2002/0037001 | A1* | 3/2002 | Jin | 370/352 |
| 2002/0150081 | A1* | 10/2002 | Fang | 370/352 |
| 2002/0150230 | A1* | 10/2002 | Fang | 379/265.09 |
| 2003/0031302 | A1* | 2/2003 | Resuta | 379/27.02 |

* cited by examiner

Primary Examiner—Bob A. Phunkulh
(74) Attorney, Agent, or Firm—Larry T. Cullen

(57) ABSTRACT

An architecture and method for permitting internet telephones assigned to a common telephone number but each having a unique IP address to be used in the manner of telephones and extension telephones in PSTN. A calling agent is provided with the fully defined address of two or more telephony devices. Telephone traffic to or from either of these devices is directed to a call agent, which contacts a gateway, which rings one or both of the telephony devices. This gateway then forms a bridge with a secondary gateway, to which are attached the other telephony devices that are to act as extensions of the first, and combines the audio from both so that they appear to the consumer to act like conventional PSTN extension telephones. This architecture can be used with any Internet Protocol telephony device, including video telephones.

31 Claims, 4 Drawing Sheets

ARCHITECTURE FOR LINKING MULTIPLE INTERNET PROTOCOL TELEPHONY DEVICES HAVING A COMMON TELEPHONE NUMBER

FIELD OF THE INVENTION

This invention is directed to the field of Internet Protocol (IP) telephony.

BACKGROUND OF THE INVENTION

For well over a century, telephone access has been provided by public switched telephone networks (PSTN, also known as "POTS"), in which each call requires the dedicated use of an individual telephone circuit. Improvements have been made to this system to make it more efficient (such as digitizing the analog signals that carry voice traffic), but still, the system requires the use of dedicated circuits, and thus is inherently limited in the uses to which its potential bandwidth may be put.

Conventional PSTN has also proven itself to be ill-suited to providing the consumer with certain telecommunication features believed to be desirable at an affordable price-point. For example, while video phones have been available to the public since the early 1960's, they have achieved only modest market penetration in the business market, and very little in the consumer market.

The development of Internet Protocol networks, which makes far more efficient use of available bandwidth by packetizing data streams into data frames and transporting them along dynamically changing routes, has opened up the possibility of providing the consumer both with conventional voice-only telephone services and video telephony at very competitive prices. Typically, these services can be provided over Internet Protocol networks via Voice-over Internet Protocol (VoIP), the increasingly widespread acceptance of which has facilitated the broad roll-out of IP telephony products and services to the consumer. However, the commercial acceptance of such services depends not only on their cost, but also on their being easy to use and familiar to the consumer.

One area in which PSTN is particularly easy to use is in the use of extension telephones. When a user wishes to switch phones or join in on a conversation using an extension telephone, all that he must do is raise the handset from the hook. The commercial acceptance of VoIP telephony can be advanced by systems that are similarly transparent and easy for the consumer to use.

SUMMARY OF THE INVENTION

The present invention provides architecture and method for permitting IP telephone devices, including those offering video, to be used in much the same manner of conventional PSTN telephones and extension phones. A call agent is provided with the fully defined address of two or more telephony devices in the consumer's home. When a call comes in from the far end over an IP (internet protocol) telephony network (which can be an intranet connected to either the Internet or PSTN), it is directed to the CA, which contacts a gateway in the consumers home. This causes the gateway to ring a selected known telephony device. This gateway then forms a bridge with a secondary gateway, to which are attached telephony devices that then appear to the consumer to act like conventional PSTN extension telephones. This architecture (which operates in the same manner for outbound calls) can be used with any IP telephony device, including video telephones.

DETAILED DESCRIPTION

Figure 1:
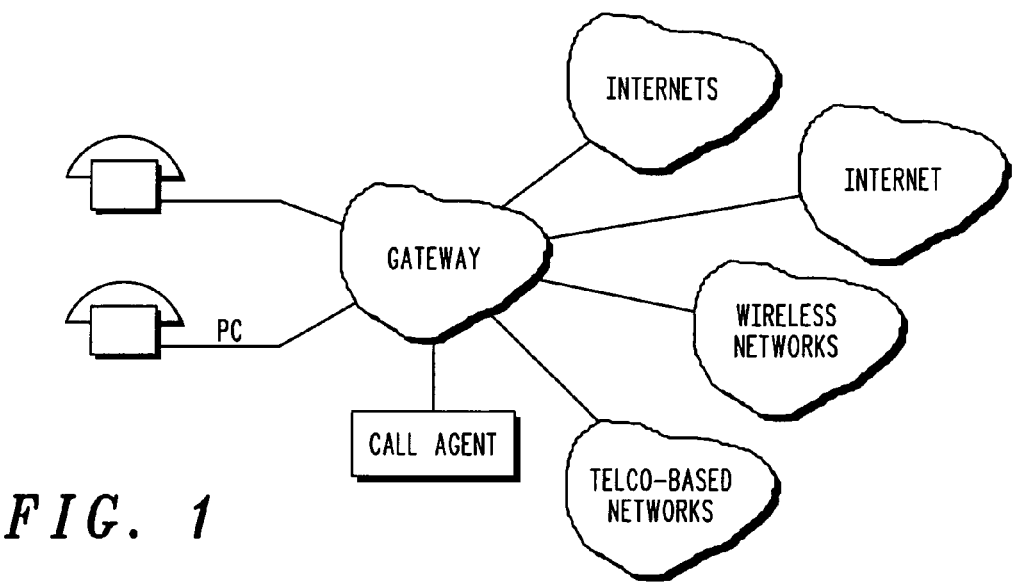
FIG. 1 is a block diagram of the various network connections to which the present invention can be directed.

FIG. 1 schematically illustrates several of the environments in which the present invention can be employed. For example, VoIP (Voice over Internet Protocol) telephony can be practiced via the Internet, local IP networks (intranets, wide area networks etc.), mobile wireless networks, or other telco-based systems.

Figure 2A:
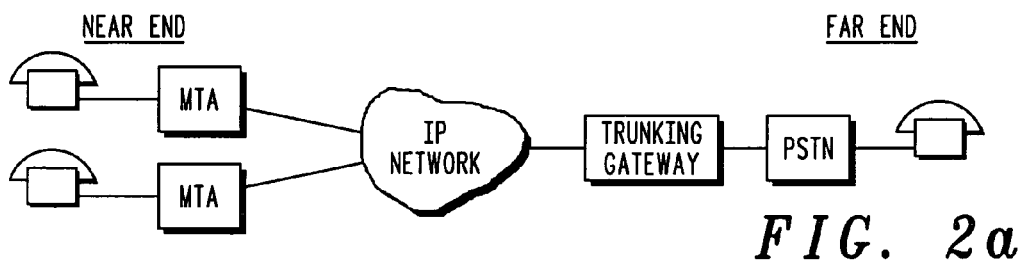
FIGS. 2a-2d illustrate several of the VoIP topologies with which this invention can be practiced.

In each of the illustrated topologies, a telephone at the near end is connected to a Media Telephony Adapter (MTA). In each topology, the MTA packetizes the voice traffic into (and from) data frames (also known as IP datagrams or datapackets) for transmission to and from the far-end connection. The MTA is connected to an IP network. In the topology of FIG. 2a, the IP network connects at the far end to a trunking gateway, and thence to a PSTN to which a far-end telephone is connected. This topology would be used in the event that only the near-end party has access to IP telephony.

Figure 2B:
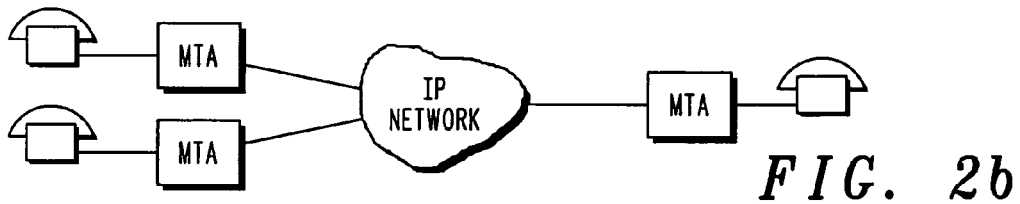
Figure 2C:
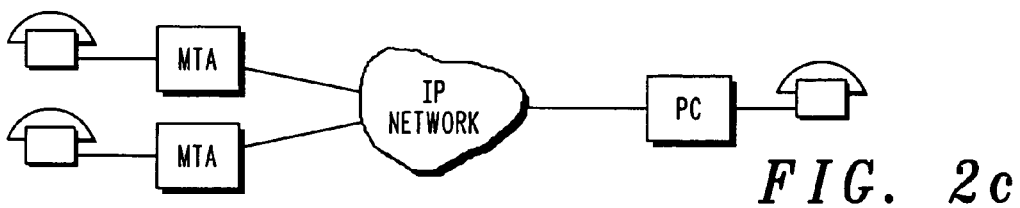
Figure 2D:
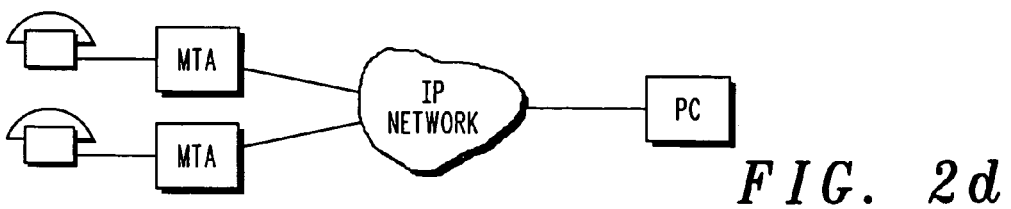

In the topology shown in FIG. 2b, the far-end user makes use of his own MTA instead of a trunking gateway and PSTN, and in the topology of FIG. 2c a PC is used for this purpose. The topology shown in FIG. 2d dispenses with the use of a separate telephone at the far end. Here, the PC serves both as a gateway and also provides the hardware functions normally provided by a telephone (e.g., microphone input, audio circuits, the provision of switching signals etc.).

The present invention provides for a way of linking several devices that are assigned a common telephone number such that they behave more like the devices consumers are familiar with using POTS (PSTN). Specifically, just as a user understands that by picking up a telephone receiver that is an extension of another telephone that he can participate in the conversation without further effort to form the connection, the present invention provides a similar degree of functionality to devices that are connected to IP networks.

The present invention is directed to the near end, where it is desired to create a connection between two internet devices that share a common telephone number.

FIG. 3a illustrates one embodiment of the invention. The present system has a call agent (CA) in which resides most of the intelligence for the system. The CA handles call control operations, and has access to data bases that define the location, type, and internet addresses of the end points etc. Typically, a subscriber to VoIP will provide information concerning appliances that are to be connected to an IP network, and this information is then loaded into the data base of the CA. In the embodiments illustrated here, these will be a single video telephony device (VTD) and single voice-only telephone. However, a multiplicity of such devices, as well as any other communication device, can be used, and in any combination. Each of these devices is connected to a media telephony adapter (MTA), a gateway which handles the translation of information to and from packetized form. The MTA associated with the VTD in this embodiment is built into the VTD itself, the other MTA is provided with a number of ports, to which voice only telephone devices can be attached. Each MTA has a fully formed domain name that is known to the CA.

Figure 3:
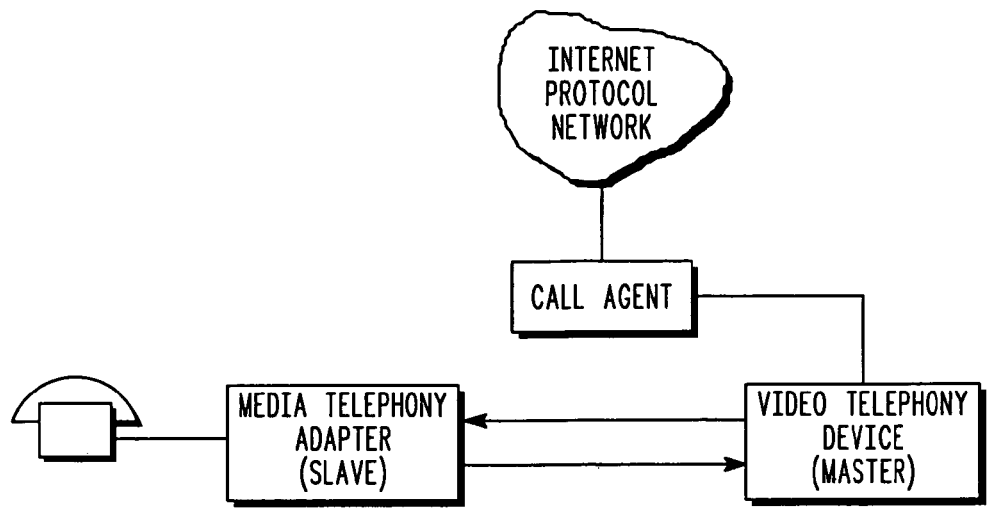
FIGS. 3a and 3b are block diagrams of the logical connections between a calling agent and end devices according to first and second embodiments of the invention.

One of the two MTDs is designated as a master and the other a slave by the end user. (This designation carries over to the telephony devices with which they are connected.) For example, in this embodiment, the VTD is the master and the audio-only MTA is the slave. In the event of an incoming telephone call, the CA looks up the telephone number that has been dialed at the far end and associates it with two devices, the MTA of the VTD and the MTA of the voice-only MTA. Each of these has a fully defined address under IP by which the CA can form a communication link with the MTA. In the embodiment of FIG. 3 the CA contacts the master VTD, which then forms a bridge with the other MTA over which communication can be joined. In the embodiment of FIG. 3b, the CA contacts both MTAs, but again, the master MTA is responsible for forming the bridge. (In an alternative embodiment, whichever device is picked up first serves as the "master" that forms the bridge. However, it is preferred that only one device serve as the master so as to keep costs to a minimum.)

Figure 4A:
FIGS. 4a and 4b illustrate two embodiments of the formation of a bridge between first and second telephony devices.
Figure 4B:
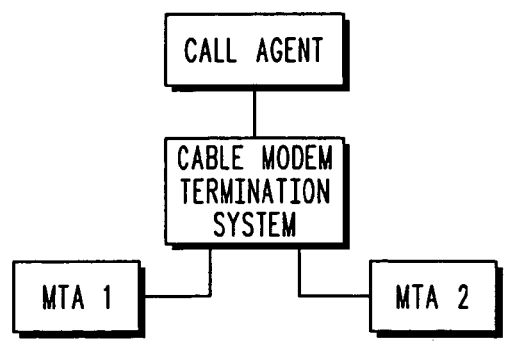

For the end-user to utilize the devices associated with the MTAs as readily as he is accustomed to using extension telephones on PSTN, it is necessary for a bridge to automatically be formed between the devices when a call is answered or initiated on either device. This entails sending the audio from one of the MTAs to the other, and combining it with the incoming far end stream, and permitting this information to be shared by the end devices. In many instances the MTAs will be connected via a local Ethernet connection to permit the establishment of the bridge by the master MTA (FIG. 4a). In an alternative embodiment, the connection is formed across an intermediate device, such as a cable modem termination system (FIG. 4b). In either case, however, it is the master MTA which directs the formation of the bridge.

Figure 5A:
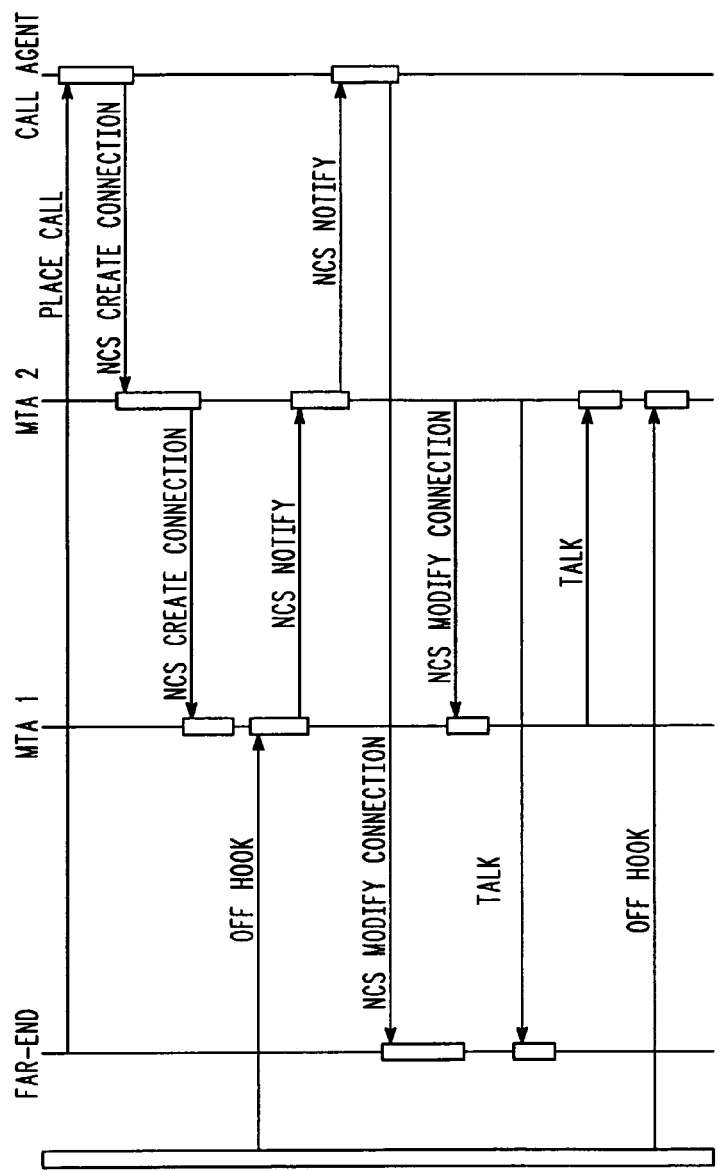
FIGS. 5a and 5b are sequence diagrams of several embodiments of the invention.
Figure 5B:
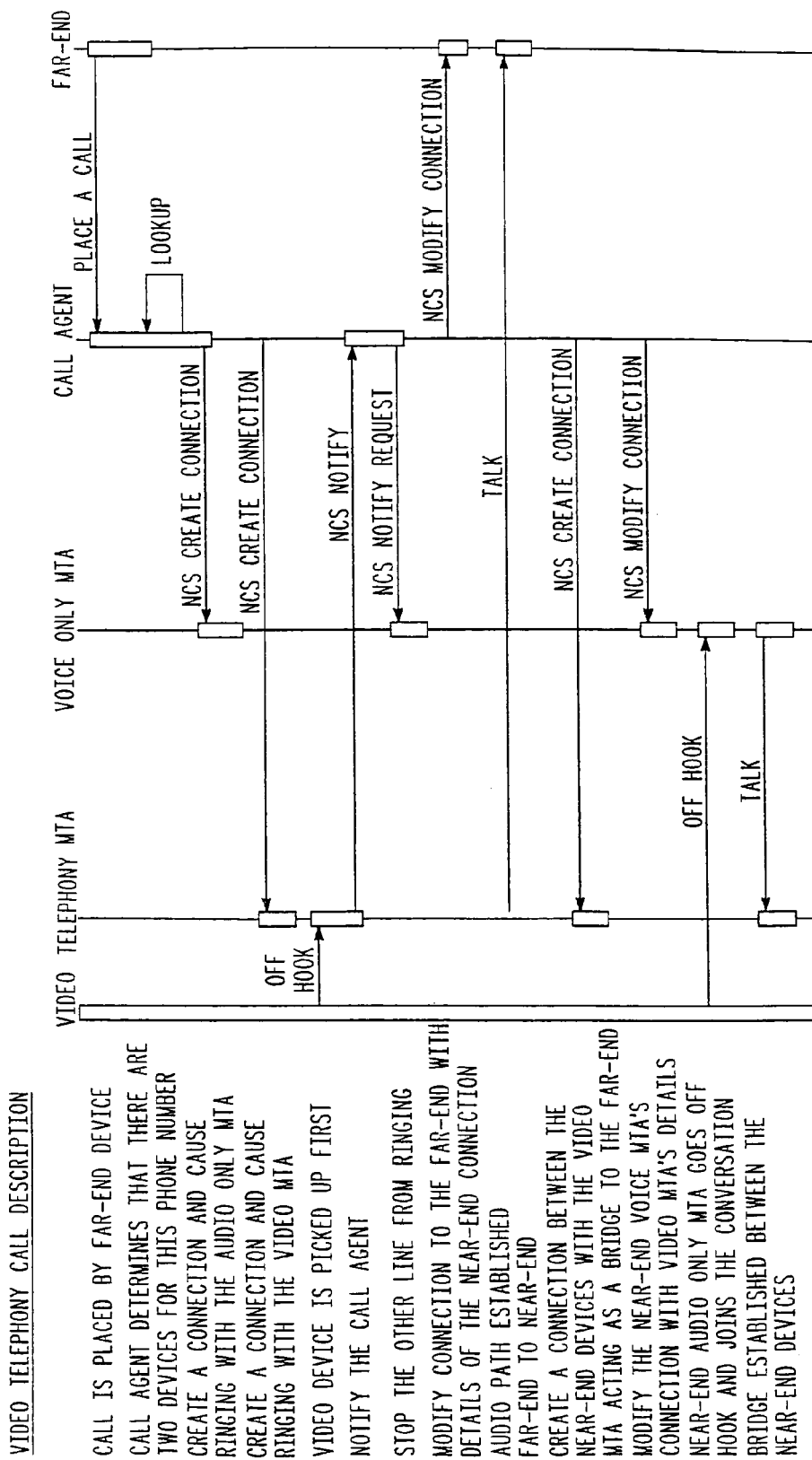

FIGS. 5a and 5b further illustrate the signaling employed by the invention. In FIG. 5a, an incoming call from the far end is routed to the CA, which rings MTA1 (here, the master), which then rings the second MTA2 (slave). When whichever device is attached to MTA2 goes offhook, MTA2 notifies MTA1 of this state, which in turn notifies the CA. The CA creates a connection from the far end to MTA1, which then creates a connection to MTA2. In the illustrated embodiment, these connections are made using Network Centric Signaling, which is a variant of the Media Gateway Control Protocol (MGCP). Audio packets (and video packets, if applicable) then pass from the far end through the CA to MTA1. Where, as in this example, MTA2 is voice-only, MTA1 passes audio on to MTA2. Audio is exchanged over the bridge between MTA1 and MTA2 and combined for transmission to the far end at MTA1. Thus, the person who picks up a device attached to MTA2 experiences the same ease of use as would be the case if it were merely an extension telephone attached to a conventional circuit switched system.

FIG. 5b shows the case in which the CA rings devices attached to both the master and the slave MTS. Here, a call is placed and goes to the CA, which looks up the information necessary to create connections both to the voice-only MTA and to the Video Telephony MTA. The video device is picked up first, and (as the master in this example), so notifies the CA, which stops the other line from ringing. An audio path is established from the far end to the near end, and the master MTA creates a bridge to the other MTA and associated devices. (This is done in the case where the incoming call is audio only. Alternatively, a video path or even both a video and an audio path could be established, where supported by the hardware in use.) When the near end audio of the voice-only MTA goes off hook, voice from it is combined with that from the Video MTA and mixed at the master video MTA, and exchanged so that each user at the near end can hear what is said by the other. The combined voice is forwarded by the video MTA to the CA.

While the invention has been described above for use with VoIP, the use of protocols other than VoIP that are suitable for communicating over networks is within the scope of the invention.

What is claimed is:

1. A method for connecting a plurality of devices which have a common telephone number and which are connected to a network, comprising the steps of:
    looking up the telephone number in a table that associates the telephone number with a plurality of devices having an address, each device having a unique domain name;
    establishing a connection with at least one of said devices;
    establishing a bridge between that device and a secondary device, the second device having a different address than the first device and a common telephone number with the first device, whereby the common telephone number enables the first device and the second device to connect to a communication with another device without further connection,
    wherein the step of looking up the telephone number in the table is performed by a call agent, the devices are connected to gateways, and the call agent connects a gateway, which establishes the connection with the first device.

2. The method of claim 1, wherein the gateway contacted by the call agent establishes a bridge to a second gateway, to which a second device is attached.

3. The method of claim 1, wherein the first gateway mixes information from both at least one device attached to the first gateway and at least one device attached to the second gateway.

4. The method of claim 1, wherein at least one of the devices comprise a voice-only telephone.

5. The method of claim 1, wherein at least one of the devices comprise a video telephone.

6. The method of claim 1, wherein the devices comprise at least one voice-only telephone attached a first gateway, and at least one video telephone attached to a second gateway.

7. The method of claim 1, wherein Voice over Internet Protocol is used to communicate with the devices.

8. The method of claim 1, wherein the connection to the devices is established using media gateway control protocol.

9. The method of claim 1, wherein the network is attached to the Internet.

10. The method of claim 9, wherein the network attached to the Internet is an Internet Protocol network.

11. The method of claim 1, wherein the network is attached to a PSTN.

12. The method of claim 11, wherein the network attached to the Internet is an Internet Protocol network.

13. The method of claim 1, wherein the network is attached both to the Internet and to PSTN.

14. The method of claim 1, wherein the network that is attached both to the Internet and to PSTN is an Internet Protocol network.

15. The method of claim 1, wherein the bridge is established via a cable modem termination system.

16. The method of claim 1, wherein the bridge is established by whichever device is first answered.

17. The method of claim 1, wherein the bridge is established via an Ethernet connection between the devices.

18. The method of claim 1, wherein the bridge conveys audio information.

19. The method of claim 1, wherein the bridge conveys video information.

20. An apparatus for connecting a plurality of devices which have a common telephone number and which are connected to a network, comprising:
   a call agent that associates the telephone number with a plurality of devices, each of which has a unique domain name;
   a network for establishing a connection with at least one of said devices;
   gateways to which the devices are connected; and
   a bridge between that device and a secondary device, the second device having a different address than the first device and a common telephone number with the first device, whereby the common telephone number enables the first device and the second device to connect to a communication with another device without further connection,
   wherein the call agent contacts a gateway, which establishes a connection with a first device.

21. The apparatus of claim 20, wherein the gateway contacted by the call agent establishes a bridge to a second gateway, to which a second device is attached.

22. The apparatus of claim 20, wherein the first gateway mixes information from both at least one device attached to the first gateway and at least one device attached to the second gateway.

23. The apparatus of claim 20, wherein the devices comprise a voice-only telephone.

24. The apparatus of claim 20, wherein the devices comprise a video telephone.

25. The apparatus of claim 20, wherein the devices comprise at least one voice-only telephone attached a first gateway, and at least one video telephone attached to a second gateway.

26. The method of claim 20, wherein Voice over Internet Protocol is used to communicate with the devices.

27. The method of claim 20, wherein the connection to the devices is established using media gateway control protocol.

28. The method of claim 20, wherein the network is attached to the Internet.

29. The method of claim 20, wherein the network is attached to a PSTN.

30. The method of claim 20, wherein the network is attached both to the Internet and to PSTN.

31. A method for connecting a two devices which are associated with a common telephone number, comprising the steps of:
   looking up the telephone number in a table that associates the telephone number with the domain names of at least one of the devices, each device having a unique domain name;
   establishing a connection with that device;
   establishing a secondary connection between that device and a secondary device, the secondary device having a different address than the first device and a common telephone number with the first device, whereby the common telephone number enables the first device and the second device to connect to a communication with another device without further connection,
   wherein the step of looking up the telephone number in the table is performed by a call agent, the devices are connected to gateways, and the call agent connects a gateway, which establishes the connection with the first device.

* * * * *